March 13, 1928.  1,662,188
E. HELMUS ET AL
SHOCK ABSORBER
Filed May 16, 1924   2 Sheets-Sheet 1
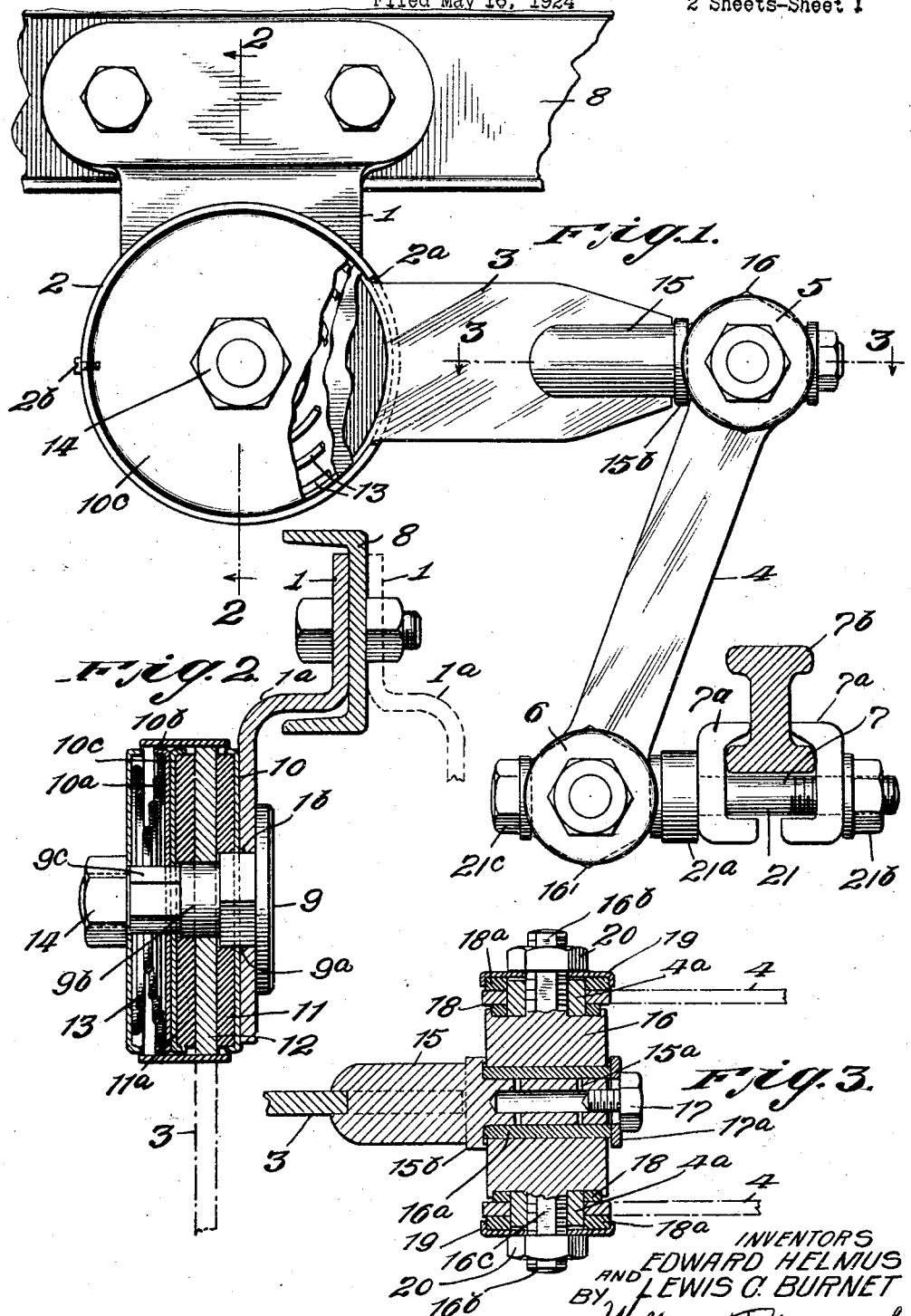
INVENTORS
EDWARD HELMUS
AND LEWIS C. BURNET
BY William P. Hammond
ATTORNEY

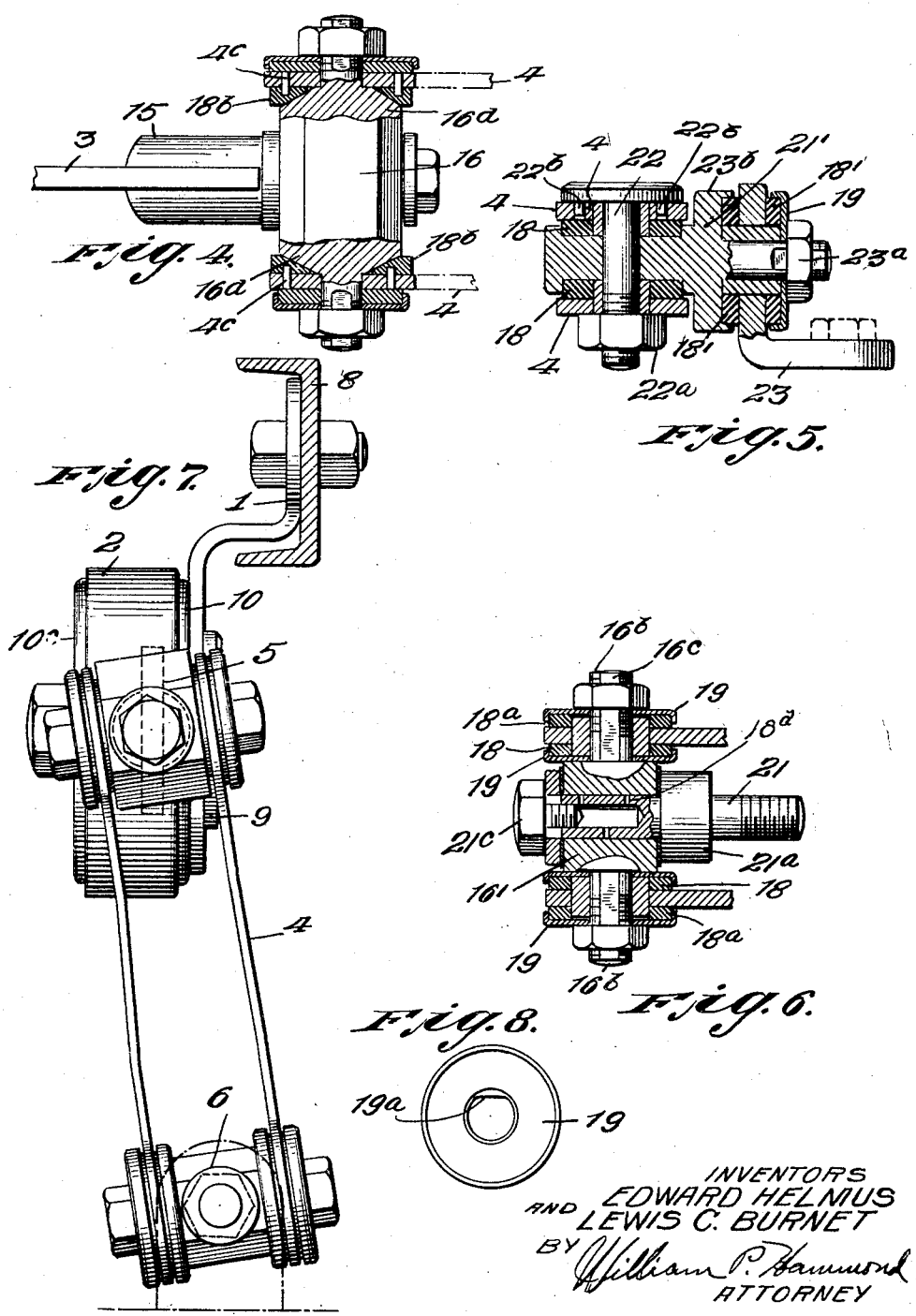

Patented Mar. 13, 1928.

1,662,188

UNITED STATES PATENT OFFICE.

EDWARD HELMUS, OF BROOKLYN, NEW YORK, AND LEWIS C. BURNET, OF GLEN RIDGE, NEW JERSEY.

SHOCK ABSORBER.

Application filed May 16, 1924. Serial No. 713,681.

This invention relates to shock absorbers for automobiles and other vehicles and more especially to shock absorbers of the friction disk type wherein the compression and rebound movements of the vehicle springs are checked by the friction movement of one or more frictional contacting surfaces.

It is an object of the invention to provide a shock absorber of inexpensive construction which is universally adaptable to all makes of automobiles and can be applied in any position on the automobile.

Another object of the invention is to provide a shock absorber of long life which can be easily adjusted to take up wear on the moving parts thereof and which will not develop squeaks and rattles in service.

Another object of the invention is to provide a shock absorber which will permit side thrusts of the vehicle body relative to the running gear without straining or breaking the shock absorber connections.

Various other objects and advantages will appear as the description of the invention proceeds.

Referring now to the drawings which illustrate a preferred form of embodiment of the invention.

Figure 1 is a side view of the shock absorber in operative position with parts broken away to show the interior construction thereof.

Figure 2 is a sectional view approximately on the line 2—2 of Figure 1.

Figure 3 is a sectional view on line 3—3 of Figure 1.

Figure 4 is a part sectional view of a modified form of connecting member.

Figure 5 is a sectional view of a modified form of connection between the brake arm and the running gear of the vehicle.

Figure 6 is a sectional view of the joint between the lower connection member and the arms.

Figure 7 is an end view of the shock absorber when mounted out of alignment with the lower connection.

Figure 8 is a side view of one of the cup plates.

In the embodiment illustrated the shock absorber comprises a bracket member 1 to be connected to the frame of the vehicle, a circular housing 2 containing the frictional snubbing members, a brake arm 3 projecting outward from the housing, connecting members 4 attached to the arm 3 by means of a universal joint 5, a second universal joint 6 at the other end of the connecting members 4 and means 7 to clamp the joint 6 to the vehicle axle or some other part of the running gear. The bracket member 1 is offset at $1^a$ so that it may be attached to either side of the channel 8 of the frame as indicated in Figure 2. The lower end of the bracket 1 has a hexagonal opening $1^b$ therein through which the bolt 9 for supporting the snubbing members extends. The bolt 9 is provided with a hexagonal portion $9^a$ which fits within the opening $1^b$ of the bracket member and supports the cap plate 10 and friction disk 11 of the snubber, the circular portion $9^b$ of the bolt 9 supports the friction plate 12, to which the arm 3 is integrally connected with its inner face contacting with the disk 11 and the outer surface contacting with a disk $11^a$ held nonrotatably on the bolt 9 by the cap plate $10^a$ which fits upon the portion $9^c$ of the bolt.

The disks 11 and $11^a$ are pressed against the sides of the plate 12 by a coil spring 13 compressed between the cap plates $10^b$ and $10^c$ also fitted upon the portion $9^c$ of the bolt 9, and the entire assembly is secured upon the bolt by the nut 14. The pressure of the spring 13 is sufficient to keep the disks 11 and $11^a$ in firm frictional contact with the plate 12 so as to frictionally resist movement of the arm 3 and plate 12 in either direction and thereby check the compression or rebound of the vehicle springs. The arm 3 projects out through an opening $2^a$ in the housing 2 and a bolt $2^b$ secures the housing to the edge of the plate 12. The disks 11 and $11^a$ are preferably formed of wood, cork or other material which has a high frictional resistance and are preferably impregnated with oil or the like to prevent squeaking when the plate 12 is turned relative to the disks.

As the arm 3 and housing 2 may be turned about the bolt 9 and the frictional resistance between the disks 11 and $11^a$ and plate 12 is the same in all positions, it will be readily apparent that the arm 3 may be turned so as to project either to the front or rear from the bracket 1 when mounted on the automobile without reducing the efficiency of the shrock absorber in any way, thereby permitting use of the shock absorber on either front or rear springs at either side of the vehicle. The connecting plates 4 and clamping means 7 are connected to each other and to the arm 3 by universal joints 5 and 6 so that they may be readily adjusted to the desired connecting or clamping position in whatever direction the arm 3 is turned.

The end of the arm 3 has connected therewith a stud 15 with a hollow portion $15^a$ in the end thereof and an enlargement or collar $15^b$ thereon. A centrally bored yoke member 16 is rotatably fitted on the end $15^a$ of the stud and retained thereon by the bolt 17 and washer $17^a$. To increase the resistance to relative movement between and prevent rattling of the parts the yoke 16 and stud 15 a bushing $16^a$ of oil impregnated cork or wood may be provided and if desired the hollow portion $15^a$ of the stud may be packed with oil or grease to lubricate the bushing.

From the ends of the yoke member 16 a pair of studs $16^b$ project outward and on these studs are pivoted one end of the connecting plates 4. At each side of the plates 4 a washer 18 or $18^a$ of friction material such as oil treated wood or cork is pressed into firm contact with the plates 4. Cap plates 19 with an opening $19^a$ corresponding to the flattened side $16^c$ of the studs $16^b$ hold the washers $18^a$ nonrotatably on the studs $16^b$ and nuts 20 are screwed upon the studs to secure the desired pressure between the washer 18 and $18^a$ and the plates 4. A bushing $4^a$ permits rotation of the plates 4 on the studs $16^b$ without injury to the threads of the studs.

Between the lower end of the connecting plates 4 a similar yoke 16' is located and through the central bore of the yoke 16' a bolt 21 extends to the axle or other portion of the running gear to be connected thereto by means of the clamping members $7^a$ which are slidable on the bolt 21 between the collar $21^a$ and nut $21^b$ to grip or release the axle member $7^b$.

The hollow portion of the bolt 21 passes through the bore of the yoke 16' and is secured therein by the collar $21^a$ and nut $21^c$. Holes $19^d$ through the walls of the hollow portion of the bolt permit grease to pass out to lubricate the bore of the yoke 16. The cap plates 19 at each side of the washers 18 and $18^a$ are nonrotatably mounted on the studs $16^b$.

Figure 4 shows a modified form of construction for the yoke 16. In this embodiment the ends of the body portion are tapered at $16^d$ and a tapered washer $18^b$ is inserted between the tapered portions $16^d$ and the plates 4, pins $4^c$ extending from the plates 4 into the washers $18^b$ so that the washers turn with the plates 4 and rub against the portions $16^b$.

In the modification shown in Figure 5 a bolt 22 extends through the ends of the plates 4 and through the opening in the eye bolt 21', friction washers 18 are compressed between the plates 4 and the eyebolt to resist unnecessary movement and provide lubrication between the parts. The bolt 22 is connected to turn with the plate 4 by the pins $22^b$ which extend into holes in one of the connecting plates, and a nut $22^a$ retains the assembly upon the bolt 22.

On the end of the eye bolt 21' an angular connecting member 23 is pivoted so as to permit the bolt 21' to be connected to portions of the vehicle at the side of the bolt 21'. A friction washer 18' is retained in a depression 23' in the collar $23^b$ of the eye bolt 21' and a second friction washer 18' is forced against the other side of the connecting member 23 by means of the cap plate 19 and nut $23^a$ to prevent unnecessary turning of the connection 23 on the eyebolt. It is to be noted that in this modification the shanks of the bolt 22 and eyebolt 21' are at right angles to each other so as to permit rotation of the parts in two planes to provide the necessary universal movement.

The friction washers 18, $18^a$, etc., of oil impregnated wood, cork or the like serve two purposes in the shock absorber, first, by their firm frictional contact with the moving parts they prevent rattling which unavoidably develops when there is only metal to metal contact in structures of this type, and, second, the oil impregnation of the washers insures sufficient continual lubrication to prevent squeaking when the parts are turned.

Figure 7 shows how the universal joints 5 and 6 permit the shock absorber to be attached to parts of the automobile which need not be in alignment.

It will be understood of course that the universal joint at the lower end of the connecting plates 4 may be omitted if desired and the plates connected to the running gear directly or by means of an ordinary pivoted connection without departing from the spirit of our invention.

If desired the arm 3 could be connected to the shock absorber proper so as to permit rotation of the arm in a plane perpendicular thereto while giving the desired movement and braking action in the plane parallel to the arm. Under this arrangement the side thrusts would be permitted by the connection between the brake arm and the shock absorber, and one of the universal joints could be omitted.

In compliance with the patent statutes we have described a preferred embodiment of our invention in detail however, it is to be understood that various modifications and changes can be made within the spirit of the invention without departing from the scope of the appended claims.

We claim:

1. In a shock absorber, a shock absorbing means a bracket for securing the shock absorbing means to the chassis of the vehicle, an arm extending outward from the shock absorbing means adapted to be rotated through an angle of 360 degrees, and means for securing the arm to the running gear of the vehicle including a universal joint, said universal joint including mutually perpendicular pivots, and friction washers of a fibrous material.

2. In a shock absorber, a reversible bracket adapted to be secured to the frame of the automobile, a shock absorber supported thereby, an arm projecting out from the shock absorber adapted to be rotated through 360 degrees, means for connecting the arm to the running gear of the vehicle including a pair of universal joints, each of said universal joints comprising mutually perpendicular pivots, and friction members of a fibrous material interposed between the relatively moving parts.

3. In a shock absorber, a reversible bracket adapted to be secured to the frame of the automobile, a shock absorber supported thereby, an arm adapted for complete rotation projecting out from the shock absorber, means for connecting the arm to the running gear of the vehicle, a universal joint between the connecting means and the arm and a universal joint between the connecting means and the running gear, each of said universal joints comprising mutually perpendicular pivots, and friction members of a fibrous material interposed between relatively moving parts.

4. In a shock absorber, an offset bracket adapted to be secured to the frame of the automobile, a shock absorber supported thereby, an arm projecting out from the shock absorber and adapted to be turned to either side of the shock absorber, means for connecting the arm to the running gear of the vehicle, a universal joint between the connecting means and the arm, a universal joint between the connecting means and the running gear, both universal joints comprising mutually perpendicular pivots whereby the shock absorber may be applied to any position on the vehicle, and nonmetallic packing between the movable portions of the universal joints to prevent rattling and squeaking.

5. The combination in a friction disc absorber of a bracket for supporting the shock absorber, an arm projecting out from the shock absorber adapted for 360 degree angular movement, means for connecting the arm to the running gear of the vehicle, and a universal joint between the arm and the connecting means comprising a yoke pivoted on the arm, and pivotally supporting the connecting means from the ends of the yoke.

6. The combination in a shock absorber of a bracket for supporting the shock absorber, an arm projecting out from the shock absorber, a stud on the end of the arm hollowed out and containing radial lubricant channels, means for connecting the arm to the running gear of the vehicle comprising a connecting plate, a universal joint between the connecting plate and the projecting arm, an axle bracket and a second universal joint between the connecting plate and the axle bracket, the axle bracket including a bolt having a hollowed head and radial lubricant grooves projecting therefrom.

In testimony whereof we have affixed our signatures to this specification.

EDWARD HELMUS.
LEWIS C. BURNET.